US 8,463,197 B2

(12) United States Patent
Hosono

(10) Patent No.: US 8,463,197 B2
(45) Date of Patent: Jun. 11, 2013

(54) MOBILE COMMUNICATION METHOD AND OPERATION APPARATUS

(75) Inventor: Hiroyuki Hosono, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 168 days.

(21) Appl. No.: 13/057,050

(22) PCT Filed: Jul. 31, 2009

(86) PCT No.: PCT/JP2009/063678
§ 371 (c)(1),
(2), (4) Date: Apr. 29, 2011

(87) PCT Pub. No.: WO2010/013813
PCT Pub. Date: Feb. 4, 2010

(65) Prior Publication Data
US 2011/0195742 A1 Aug. 11, 2011

(30) Foreign Application Priority Data
Aug. 1, 2008 (JP) ................................. 2008-200259

(51) Int. Cl.
*H04B 1/00* (2006.01)
*H04B 7/00* (2006.01)
(52) U.S. Cl.
USPC ......... 455/69; 455/41.2; 455/456.1; 455/522; 370/248; 370/338
(58) Field of Classification Search
USPC .............. 455/69, 3.03, 41.2, 412, 423, 432.1, 455/456.1–456.6, 500, 501, 522, 561; 370/248, 370/252, 329, 338, 347
See application file for complete search history.

(56) References Cited

U.S. PATENT DOCUMENTS
2005/0255890 A1 11/2005 Nakada

FOREIGN PATENT DOCUMENTS
| JP | 2002 290595 | 10/2002 |
| JP | 2003 37555 | 2/2003 |
| JP | 2004 213475 | 7/2004 |
| JP | 2005 328152 | 11/2005 |

OTHER PUBLICATIONS

"Femtocell Kichikyoku no Katsuyo ni Muketa Denpaho Oyobi Denki Tsushin Jigyoho Kankei Horei ni Kansuru Toriatsukai Hoshin", no Kohyo, Ministry of Internal Affairs and Communication, (MIC), total pp. 20, (Apr. 17, 2008) (with English translation).
"Requirements for LTE Home eNodeBs", 3GPP TSG RAN #35, RP-070209, Orange, Telecom Italia T-Mobile, Vodafone, Agenda Item: 10:19, Discussion & Decision, total pp. 4, (Mar. 6-9, 2007).
International Search Report issued Sep. 29, 2009 in PCTJP09/063678 filed Jul. 31, 2009.

*Primary Examiner* — Shaima Q Aminzay
(74) *Attorney, Agent, or Firm* — Oblon, Spivak, McClelland, Maier & Neustadt, L.L.P.

(57) ABSTRACT

A mobile communication method according to the present invention causes: an operation apparatus 100 to transmit an operation halt instruction to a first radio station 200, when the first radio station 200 satisfies a first halt condition; causes the operation apparatus to transmit confirmation information for confirming whether or not to accept halting operation to a communication device 300 linked with a second radio base station 201, when the second radio station 201 satisfies a second halt condition; causes the operation apparatus 100 to transmit the operation stop instruction to the second radio base station 201, when it receives acknowledgement information for the confirmation information; causes the first radio base station 200 to gradually reduce transmission power of broadcast information when it receives the operation halt instruction and to halt stop after the transmission power of the broadcast information reaches a predetermined value; and causes the second radio base station 201 to stop when it receives the operation halt instruction.

6 Claims, 2 Drawing Sheets

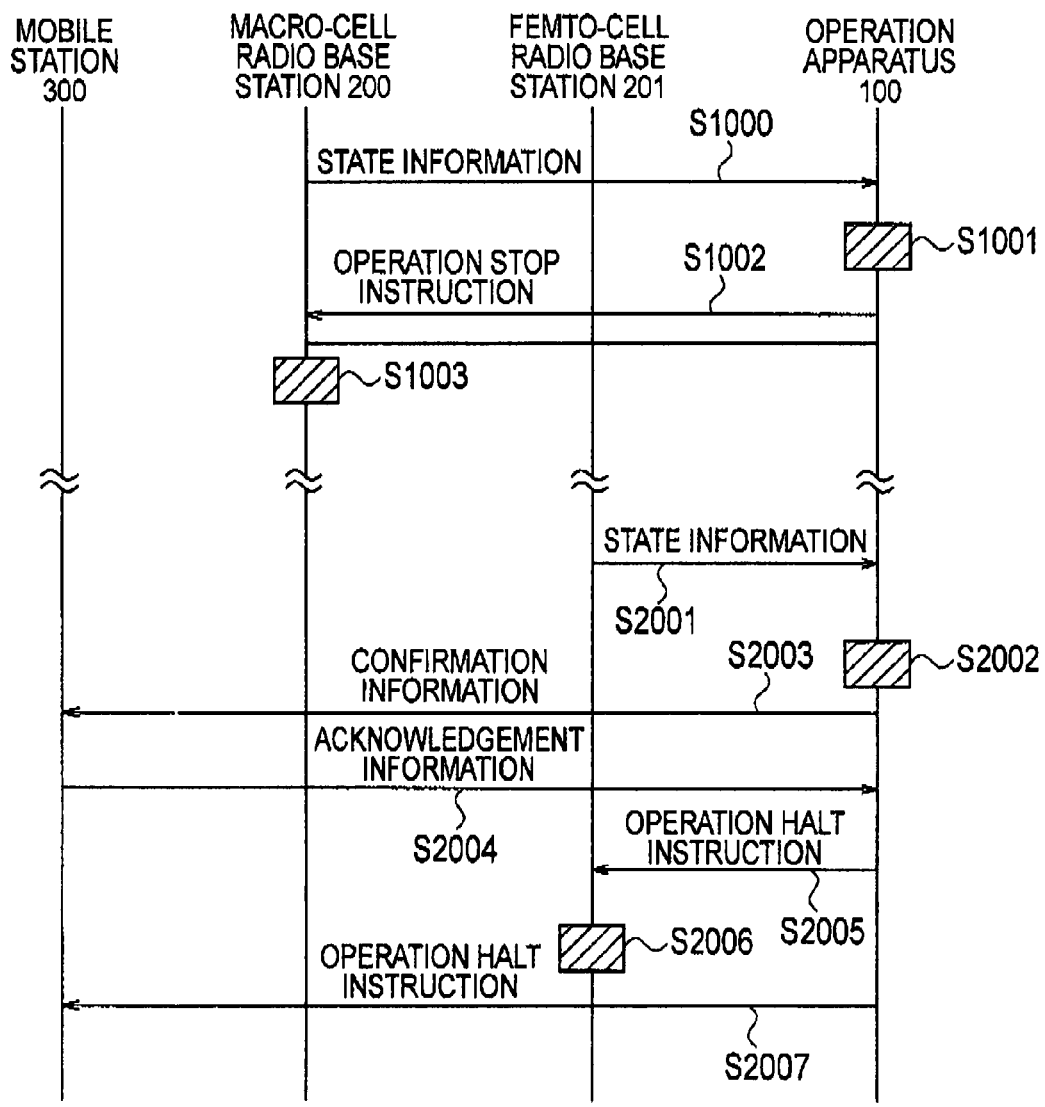

MOBILE COMMUNICATION METHOD AND OPERATION APPARATUS

TECHNICAL FIELD

The present invention relates to a mobile communication method and an operation apparatus.

BACKGROUND ART

A mobile telecommunications carrier generally monitors a device state (normal/abnormal) of each macro-cell radio base station which offers a public communication service, in order to respond to occurring connection requests from a mobile station at random, and stops a macro-cell radio base station in an abnormal device condition by transmitting an operation halt instruction thereto to avoid a situation (call disconnection or the like, for example) in which a communication service is hindered due to making a mobile station communicate under the macro-cell radio base station in the abnormal device condition.

SUMMARY OF THE INVENTION

Problem to be Solved by the Invention

In recent years, studies have been made for operational methods of a so-called femto-cell radio base station (Home eNB) which is a radio base station installed in a small area such as a home.

However, a femto-cell radio base station is not owned by a mobile telecommunications carrier but is owned by a subscriber of the mobile telecommunications carrier. Accordingly, there is a problem that, if a device condition of the femto-cell radio base station becomes abnormal, the mobile telecommunications carrier cannot halt the femto-cell radio base station by transmitting an operation stop instruction at the discretion of the carrier.

The present invention has been made in view of the foregoing problem, and has an objective to provide a mobile communication method and an operation apparatus which are capable of smooth maintenance and operation of a macro-cell radio base station and a femto-cell radio base station in an environment where there are both of the radio base stations in a mixed manner.

Means for Solving the Problem

The first feature of the present invention is summarized in that a mobile communication method including the steps of: causing an operation apparatus to transmit an operation stop instruction to a first radio station installed inside a mobile telecommunications carrier network managed by a mobile telecommunications carrier, when the first radio station satisfies a first halt condition; causing the operation apparatus to transmit confirmation information for confirming whether or not to accept stopping operation to a communication device linked with a second radio base station installed outside the mobile telecommunications carrier network, when the second radio station satisfies a second stop condition; causing the operation apparatus to transmit the operation stop instruction to the second radio base station, when the operation apparatus receives acknowledgement information for the confirmation information; causing the first radio base station to gradually reduce transmission power of broadcast information when the first radio base station receives the operation stop instruction and to stop after the transmission power of the broadcast information reaches a predetermined value; and causing the second radio base station to stop when the second radio base station receives the operation stop instruction.

The second feature of the present invention is summarized in that an operation apparatus including: a first instruction unit configured to transmit an operation stop instruction to a first radio station installed inside a mobile telecommunications carrier network managed by a mobile telecommunications carrier, when the first radio station satisfies a first stop condition; a confirmation unit configured to transmit confirmation information for confirming whether or not to accept stopping operation to a communication device linked with a second radio base station installed outside the mobile telecommunications carrier network, when the second radio station satisfies a second stop condition; and a second instruction unit configured to transmit the operation stop instruction to the second radio base station, upon receipt of acknowledgement information for the confirmation information.

Effects of the Invention

As described above, the present invention can provide a mobile communication method and an operation apparatus which are capable of smooth maintenance and operation of a macro-cell radio base station and a femto-cell radio base station in an environment where there are both of the radio base stations in a mixed manner.

BRIEF DESCRIPTION OF THE DRAWINGS

FIG. 3 is a sequence diagram showing operations of the mobile communication system according to the first embodiment of the present invention.

MODES FOR CARRYING OUT THE INVENTION (Configuration of Mobile Communication System According to First Embodiment of the Present Invention)

A configuration of a mobile communication system according to a first embodiment of the present invention will be described with reference to FIG. 1 and FIG. 2.

Figure 1:
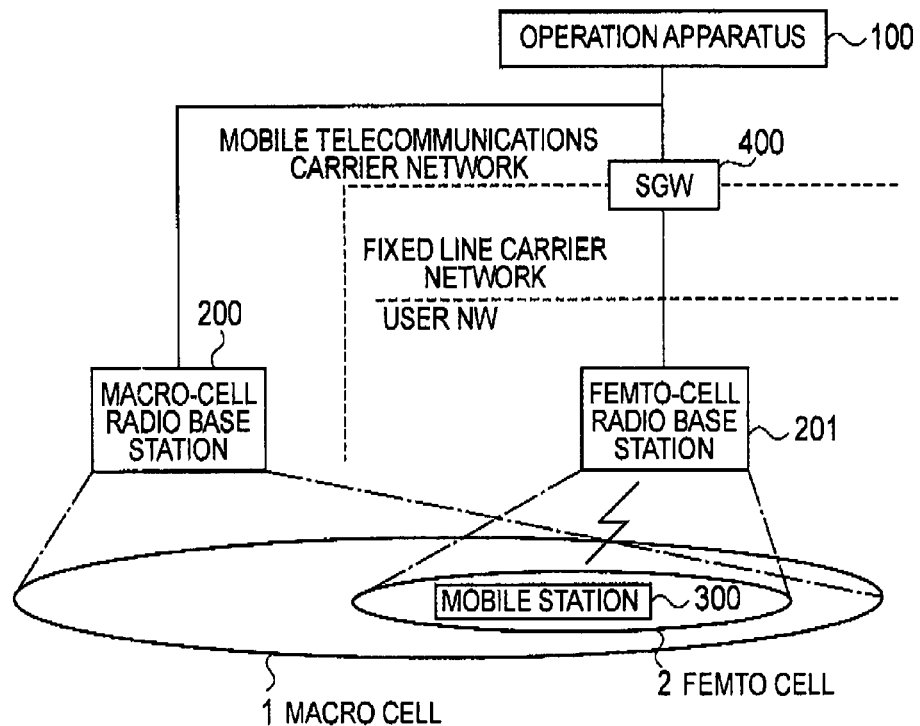
FIG. 1 is an overall configuration diagram of a mobile communication system according to a first embodiment of the present invention.

As shown in FIG. 1, a mobile communication system according to this embodiment comprises an operation apparatus 100, a gateway device (SGW Security Gateway) 400, a macro-cell radio base station 200, and a femto-cell radio base station 201.

Here, in addition to a mobile communication system using the W-CDMA scheme, the mobile communication system according to this embodiment is also applicable to a mobile communication system using the LTE (Long Term Evolution) scheme which is a next-generation mobile communication system, for example.

The macro-cell radio base station 200 and the femto-cell radio base station 201 are connected to the operation apparatus 100. The macro-cell radio base station 200 is a first radio base station provided inside a mobile telecommunications carrier network managed by a mobile telecommunications carrier while the femto-cell radio base station 201 is a second radio base station provided in a user network (a network managed by a subscriber of the mobile telecommunications carrier) outside the mobile telecommunications carrier network.

For example, the femto-cell radio base station 201 is installed in a LAN (Local area Network) managed by the above-mentioned subscriber, and is connected to the operation apparatus 100, which is installed on the mobile telecommunications carrier network, through a network of an access line carrier (a fixed line carrier network) such as FTTH (Fiber to The Home) or ADSL (Asymmetric Digital Subscriber Line).

Meanwhile, if a mobile station (such as a mobile station of the above-mentioned subscriber) 300 provided with an access permission by the femto-cell radio station 201 is located in a femto cell 2 under control of the femto-cell radio base station 201, the mobile station 300 is preferentially connected to the femto-cell radio base station 201 even when the mobile station 300 is located in a radio base station other than the femto-cell radio station 201, for example, a macro cell 1 under control of the macro-cell radio base station 200. Moreover, a discount service or the like, for example, may be granted when the mobile station 300 performs communication through the femto-cell radio base station 201.

A gateway device 400 is installed on the borderline of the mobile telecommunications carrier network. The gateway device 400 is a gateway device for protecting the mobile telecommunications carrier network against unauthorized access from other networks, and is configured to admit only the access that is authenticated by authentication processing of the gateway device 400 to the mobile telecommunications carrier network.

Meanwhile, the operation apparatus 100 is installed on the mobile telecommunications carrier network.

Figure 2:
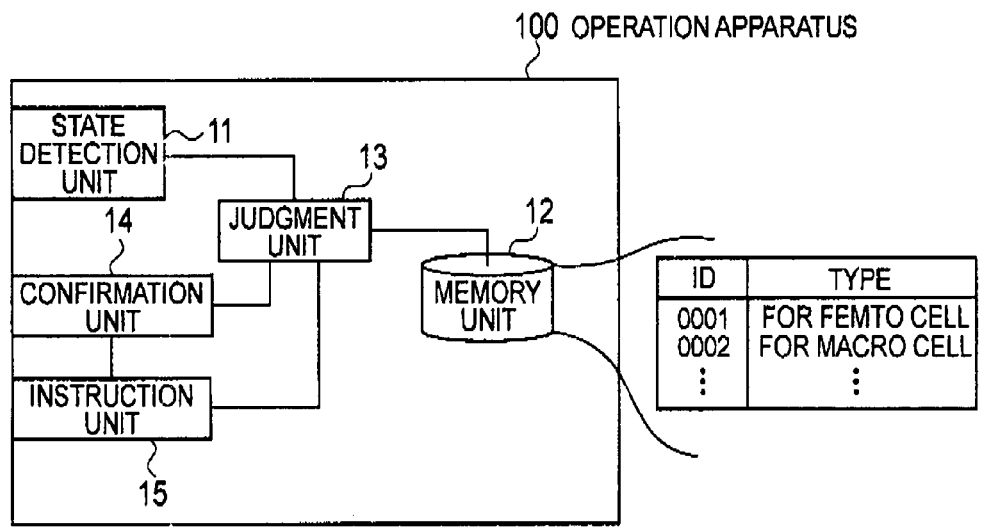
FIG. 2 is a functional block diagram of an operation apparatus according to the first embodiment of the present invention.

As shown in FIG. 2, the operation apparatus 100 includes a state detection unit 11, a memory unit 12, a judgment unit 13, a confirmation unit 14, and an instruction unit 15.

The state detection unit 11 is configured to detect states of each radio base station 201. For example, the condition detection unit 11 is configured to detect a congestion state (such as an amount of traffic or an amount of CPU usage) of each radio base station 201, a failure state (such as presence or absence of occurrence of an error in a predetermined position) of each radio base station 201, and the like as the states of each radio base station 201.

Meanwhile, the state detection unit 11 may detect the state of each radio base station based on state information notified from each radio base station at predetermined timing, or may acquire the state information by transmitting a state information acquisition request to each radio base station at predetermined timing and may detect the state of each radio base station based on the state information thus acquired.

The memory unit 12 is configured to store a type of each radio base station (specifically whether the radio base station is the macro-cell radio base station 200 or the femto-cell radio base station 201).

The judgment unit 13 is configured to judge whether or not the macro-cell radio base station 200 satisfies a first stop condition and whether or not the femto-cell radio base station 201 satisfies the second stop condition.

For example, the judgment unit 13 may judge that the macro-cell radio base station 200 satisfies the first stop condition if either the amount of traffic or the amount of CPU usage in the macro-cell radio base station 200 exceeds a predetermined threshold X, or may judge that the macro-cell radio base station 200 satisfies the first stop condition upon occurrence of a failure in a predetermined position A in the macro-cell radio base station 200.

Similarly, the judgment unit 13 may judge that the femto-cell radio base station 201 satisfies a second stop condition if either the amount of traffic or the amount of CPU usage in the femto-cell radio base station 201 exceeds a predetermined threshold Y, or may judge that the femto-cell radio base station 201 satisfies the second stop condition upon occurrence of a failure in a predetermined position B in the femto-cell radio base station 201.

The confirmation unit 14 is configured to transmit confirmation information for confirming whether or not to accept stopping the operation to a communication device (such as the mobile station 300) linked with the femto-cell radio base station 201 when the judgment unit 13 judges that the femto-cell radio base station 201 satisfies the second stop condition.

When the above-mentioned operation stop instruction is transmitted to the femto-cell radio base station 201, the confirmation unit 14 may also be configured to notify the above-mentioned communication device (such as the mobile station 300) that the femto-cell radio station 201 has stopped.

The instruction unit 15 is a first instruction unit configured to transmit an operation stop instruction to the macro-cell radio base station 200 when the judgment unit 13 judges that the macro-cell radio base station 200 satisfies the first stop condition.

Moreover, the instruction unit 15 is a second instruction unit configured to transmit an operation stop instruction to the femto-cell radio base station 201 when the confirmation unit 14 receives acknowledgement information for the above-described confirmation information.

Note that although this embodiment describes the configuration in which the first instruction unit and the second instruction unit are implemented by the instruction unit 15, it is also possible to employ a configuration in which the first instruction unit and the second instruction unit are implemented by separate functions.

Further, the instruction unit 15 may be configured to transmit the operation stop instruction to the femto-cell radio base station 201 if a certain condition is satisfied even though the above-described acknowledgement information is not received.

For example, if a predetermined time interval has passed after transmission of the above-described confirmation information, the instruction unit 15 may be configured to judge that the certain condition is satisfied and to transmit the operation stop instruction to the femto-cell radio base station 201 even if the above-described acknowledgement information is not received. In this case, the above-described confirmation information is assumed to include a message such as "the operation of the femto-cell radio base station 201 will be stopped if there is no contact within a predetermined time interval."

(Operations of Mobile Communication System According to First Embodiment of the Present Invention)

Operations of the mobile communication system according to the first embodiment of the present invention will be described with reference to FIG. 3.

As shown in FIG. 3, the operation apparatus 100 acquires the state information on the macro-cell radio base station 200 in step S1000.

In step S1001, the operation apparatus 100 judges whether or not the macro-cell radio base station 200 satisfies the first stop condition.

When the operation apparatus 100 judges that the macro-cell radio base station 200 satisfies the first stop condition, the operation apparatus 100 transmits the operation stop instruction to the macro-cell radio base station 200 in step S1002.

In step S1003, upon receipt of the operation stop instruction, the macro-cell radio base station 200 gradually reduces transmission power of broadcast information and stops after the transmission power of the broadcast information reaches a predetermined value (such as zero).

Meanwhile, the operation apparatus 100 acquires the state information on the femto-cell radio base station 201 in step S2001.

In step S2002, the operation apparatus 100 judges whether or not the femto-cell radio base station 201 satisfies the second stop condition.

When the operation apparatus 100 judges that the femto-cell radio base station 201 satisfies the second stop condition, the operation apparatus 100 transmits the confirmation information for confirming whether or not to accept stopping the operation to the mobile station 300 linked with the femto-cell radio base station 201 in step S2003.

When the operation apparatus 100 receives the acknowledgement information for above-mentioned confirmation information in step S2004, the operation apparatus 100 transmits the operation stop instruction to the femto-cell radio base station 201 in step S2005.

In step S2006, the femto-cell radio base station 201 stops upon receipt of the operation stop instruction. Here, unlike the case of the macro-cell radio base station 200, the femto-cell radio base station 201 may be configured to stop at predetermined timing (i.e. to set the transmission power of the broadcast information to zero) without performing the operation to gradually reduce the transmission power of the broadcast information and to stop after the transmission power of the broadcast information reaches the predetermined value (such as zero).

In step S2007, the operation apparatus 100 notifies the mobile station 300 that the femto-cell radio base station 201 has stopped.

The above-described features of this embodiment may also be expressed as follows.

The gist of a first aspect of this embodiment lies in a mobile communication method comprising the steps of:

causing an operation apparatus 100 to transmit an operation halt instruction to a macro-cell radio base station (first radio station) 200 installed inside a mobile telecommunications carrier network managed by a mobile telecommunications carrier, when the macro-cell radio base station 200 satisfies a first stop condition;

causing the operation apparatus 100 to transmit confirmation information for confirming whether or not to accept stopping operation to a mobile station (communication device) 300 linked with a femto-cell radio base station (second radio base station) 201 installed outside the mobile telecommunications carrier network, when the femto-cell radio base station 201 satisfies a second stop condition;

causing the operation apparatus 100 to transmit the operation stop instruction to the femto-cell radio base station 201, when the operation apparatus 100 receives acknowledgement information for the confirmation information;

causing the macro-cell radio base station 200 to gradually reduce transmission power of broadcast information when the macro-cell radio base station 200 receives the operation stop instruction and to stop after the transmission power of the broadcast information reaches a predetermined value (zero, for example); and causing the femto-cell radio base station 201 to stop when the femto-cell radio base station 201 receives the operation stop instruction.

In the first aspect of this embodiment, the mobile communication method may further comprise the step of:

causing the operation apparatus 100 to notify the mobile station 300 that the femto-cell radio base station 201 has stopped, when the operation apparatus 100 transmits the operation stop instruction to the femto-cell radio base station 201.

In the first aspect of this embodiment, mobile communication method may further comprise the step of:

causing the operation apparatus 100 to transmit the operation stop instruction to the femto-cell radio base station 201, if a certain condition is satisfied even though the acknowledgement information is not received.

The gist of a second aspect of this embodiment lies in an operation apparatus comprising:

an instruction unit (first instruction unit) 15 configured to transmit an operation stop instruction to a macro-cell radio base station 200 installed inside a mobile telecommunications carrier network managed by a mobile telecommunications carrier, when the macro-cell radio base station 200 satisfies a first stop condition;

a confirmation unit 14 configured to transmit confirmation information for confirming whether or not to accept stopping operation to a mobile station 300 linked with a femto-cell radio base station 201 installed outside the mobile telecommunications carrier network, when the femto-cell radio base station 201 satisfies a second stop condition; and an instruction unit (second instruction unit) 15 configured to transmit the operation stop instruction to the femto-cell radio base station 201, upon receipt of acknowledgement information for the confirmation information.

In the second aspect of this embodiment, the confirmation unit 14 may be configured to notify the mobile station 300 that the femto-cell radio base station 201 has stopped, when the operation stop instruction is transmitted to the femto-cell radio base station 201.

In the second aspect of this embodiment, the instruction unit (second instruction unit) 15 may be configured to transmit the operation stop instruction to the femto-cell radio base station 201 if a certain condition is satisfied even though the acknowledgement information is not received.

(Advantageous Effects of Mobile Communication System According to First Embodiment of the Present Invention)

According to the mobile communication system of the first embodiment of the present invention, maintenance and operation of the macro-cell radio base station 200 and the femto-cell radio base station 201 can be achieved smoothly in an environment where there are both of the radio base stations in a mixed manner.

The mobile communication system according to the first embodiment of the present invention is configured to stop the operation of the femto-cell radio base station 201 upon receipt of the acknowledgement information from the mobile station 300 linked with the femto-cell radio base station 201. Hence it is possible to avoid a situation to automatically stop the operation of the femto-cell radio base station 201 regardless of the interest of an owner of the femto-cell radio base station 201 and thereby to incur enormous disadvantage to the owner of the femto-cell radio base station 201.

According to the mobile communication system according to the first embodiment of the present invention, the femto-cell radio base station 201 is configured to automatically stop the operation in response to the operation stop instruction from the operation apparatus 100. Hence a mobile telecommunications carrier can perform maintenance and operation of the femto-cell radio base stations 201 even if the number of installation of the femto-cell radio base stations 201 becomes huge.

According to the mobile communication system of the first embodiment of the present invention, in the process of gradually reducing the transmission power of the broadcast information when the macro-cell radio base station 200 receives the operation stop instruction from the operation apparatus 100, a mobile station previously performing communication via the macro-cell radio base station 200 can be handed over to another radio base station. Hence it is possible to reduce occurrence of call disconnection.

According to the mobile communication system of the first embodiment of the present invention, the femto-cell radio base station 201 need not be equipped with a function to reduce the transmission power of the broadcast information gradually upon receipt of the operation stop instruction from the operation apparatus 100. Hence it is possible to reduce a price of the femto-cell radio base station 201.

Modified Example

Note that operation of the above described femto-cell radio base station 201 and the operation apparatus 100 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the femto-cell radio base station 201 or the operation apparatus 100. Also, the storage medium and the processor may be provided in femto-cell radio base station 201 or the operation apparatus 100 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising the steps of:
   causing an operation apparatus to transmit an operation halt instruction to a first radio station installed inside a mobile telecommunications carrier network managed by a mobile telecommunications carrier, when the first radio station satisfies a first stop condition;
   causing the operation apparatus to transmit confirmation information for confirming whether or not to accept stopping operation to a communication device linked with a second radio base station installed outside the mobile telecommunications carrier network, when the second radio station satisfies a second stop condition;
   causing the operation apparatus to transmit the operation halt instruction to the second radio base station, when the operation apparatus receives acknowledgement information for the confirmation information;
   causing the first radio station to gradually reduce transmission power of broadcast information when the first radio station receives the operation halt instruction and to halt after the transmission power of the broadcast information reaches a predetermined value; and
   causing the second radio base station to halt when the second radio base station receives the operation halt instruction.

2. The mobile communication method according to claim 1, further comprising the step of causing the operation apparatus to notify the communication device that the second radio base station has halted, when the operation apparatus transmits the operation halt instruction to the second radio base station.

3. The mobile communication method according to claim 1, further comprising the step of causing the operation apparatus to transmit the operation halt instruction to the second radio base station, if a certain condition is satisfied even though the acknowledgement information is not received.

4. An operation apparatus comprising:
   a first instruction unit configured to transmit an operation halt instruction to a first radio station installed inside a mobile telecommunications carrier network managed by a mobile telecommunications carrier, when the first radio station satisfies a first stop condition;
   a confirmation unit configured to transmit confirmation information for confirming whether or not to accept halting operation to a communication device linked with a second radio base station installed outside the mobile telecommunications carrier network, when the second radio station satisfies a second halt condition; and
   a second instruction unit configured to transmit the operation halt instruction to the second radio base station, upon receipt of acknowledgement information for the confirmation information.

5. The operation apparatus according to claim 4, wherein the confirmation unit notifies the communication device that the second radio base station has halted, when the operation halt instruction is transmitted to the second radio base station.

6. The operation apparatus according to claim 4, wherein the second instruction unit transmits the operation halt instruction to the second radio base station if a certain condition is satisfied even though the acknowledgement information is not received.

* * * * *